7145X
I. Van Gorder.
Churn.
No.
Patented Jan. 27, 1832.
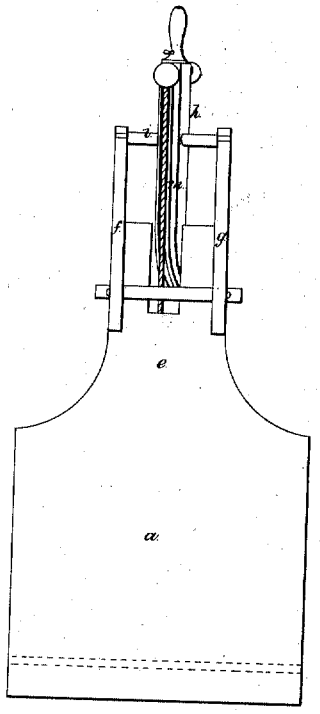
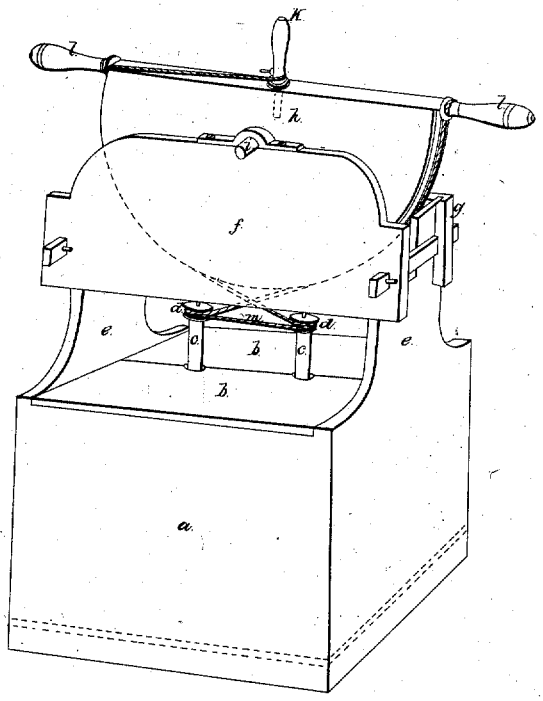
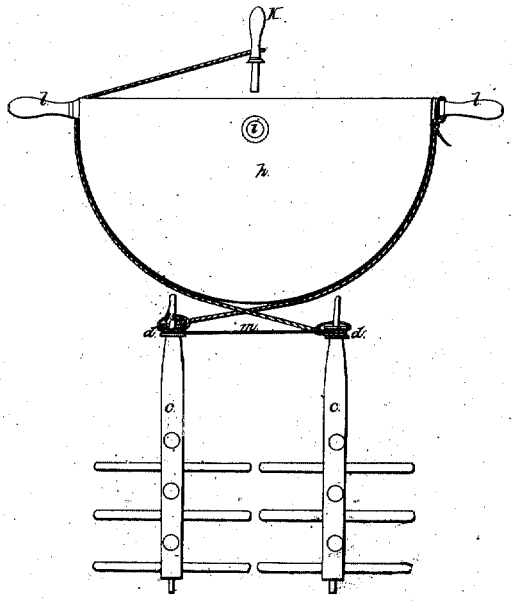
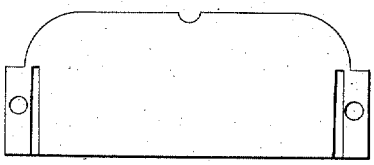

7145X June 27. 1832

Isaac Van Gorder of Warren Ohio
Letters Patent

The Schedule referred to in these Letters Patent and making part of the
same containing a description in the words of the said Isaac Van Gorder
himself of his improvement in the Churn To all to whom these presents shall come. Be it Known that I,
Isaac Van Gorder of Warren in the County of Trumbull and State of
Ohio have invented a new and useful improvement in the Butter Churn
and that the following is a full and exact description of the construction
and operation of the said machine as invented or improved by me
to wit. The body of the churn is a square box composed of two
sides, two ends, a bottom and lid. The side and end pieces are made
of boards one and one fourth inch in thickness halv'd and nailed to-
gether, at the corners, the grain of the wood in the sides running horizontal-
ly and of the ends perpendicularly. The width of the sides is nineteen inch-
es the length of the ends corresponds with the width of the sides except
so much of the end as extends above the body of the churn forming the
posts. The bottom one inch in thickness is let into a groove made in
the side and end pieces three inches above their lower edge.
The lid consists of two pieces of equal width one inch in thickness and
is let into the top of the churn resting on a shoulder
The depth of the churn in the clear is fourteen inches the length twen-
ty inches and the width ten inches. Two round shafts one and one fourth
inch diameter are placed in the churn in an upright position the axis
of the shafts are exactly in the centre of the churn crossways & length-
ways one fourth the length of the churn in clear from each end, hav-
ing one half the length of the churn in clear between them.
Pins or rounds put thro' the shafts form the dashers. The shafts play
on gudgeons at the lower ends let into the bottom of the churn. At
the top ends of the shafts are gudgeons which play in the lower edge of
one of the plates which plate passes lengthways, over the centre of the
churn. Three inches of the top ends of the shafts are turned two

[illegible]

and one fourth inches in diameter (with a small projecting lip at the
extreme top) forming pulleys round which the cord passes. The pins
or rounds ~~are~~ half an inch diameter and ten inches long. The num
ber of pins in each shaft is six; the first pin is half an inch
from the bottom the second at right angles to the first, and one
inch above it and so on alternately each crossing the one next to it
at right angles with the space of an inch between. A post at
each end of the churn for the support of the top work is formed by
continuing the out pieces to a distance of ten inches above the top of the lid.
The posts are seven eighths of an inch in thickness and four and
a half inches wide at the top the lower part of the post next the
body of the churn may be made wider than the top or not to suit
the fancy of the workman. Two plates ten and three fourths inch-
es wide and one inch in thickness pass over the churn length
ways tied together at each end by a round or joint passing between
the plates close to the outside of the posts. The top edge of the plate
is taken out at each corner with a quarter circle so as to leave it
but four and a half inches wide at each end where it rests on the
posts. A groove corresponding in width to the thickness of the post
and three eighths of an inch deep is made in each end of each plate
where it comes against the post and each edge of the posts at the
top end is cut off five eighths of an inch wide as low down as
the bottom of the plates with a square shoulder for the lower edge
of the plate to rest on. A piece of the top of the post in the cen-
tre is taken out one and a half inch wide and three and a half
inches down for the edges of the wheel to play thro'. The lower edge
of the plate is five and a half inches from the top to the lid.
The wheel is formed of a single board and is a segment of nearly
six tenths of a circle of twenty six inches diameter. the thickness of the
wheel is one inch two semicircular grooves of suitable size for
a cord a fourth of an inch diameter are cut in the edge of the
wheel round the circular part. Three handles are attached to
the wheel to work it by one in the the centre of the straight line and one at each corner where the circle and straight line join
A Shaft one and 3/4 inch diameter passes thro' the centre of the wheel
pivots on the ends of which rest in the top edge of the plate.
A cap seven inches long and 2 1/2 inches wide cut in form of an octa-
gal is fastened to the top edge of the plate by two screws for the pur-
pose of preventing the pivots from rising up when the machine is
in operation. The wheel is put in motion by the hand & the mo-
tion communicated to the shafts by a single cord
The manner of attaching the cord to the wheel and pulleys is as follows.
One end of the cord is fastened to the handle in the centre of the dia-
edge of the wheel it passes along the edge to where the circle com-
mences and is laid in the groove next the face of the wheel towards
the pulleys it continues in the groove past one pulley and the furth-
side of the other. here it passes from the wheel to the pulley one
once and a half round it leaving the pulley on the side farthest fro-
the wheel it passes in a direction opposite to its direction on the
wheel to the other pulley. round which it passes one and a half. thence to
the other groove in the wheel where it continues in its former directio-
to the opposite corner of the wheel from where it first entered the
groove here the other end of the cord is fastened
The handle to which the first end of the cord is fastened is ma-
to turn in order to tighten the cord when necessary. The line of
the face of the wheel when hung must not be exactly parallel to
the side of the churn but turned a little diagonally about three eigh-
of an inch in 20 inches. This is necessary in order to bring the edge of
one the grooves over the edge of one of the pulleys. and the edge of the other
groove over the edge of the other pulley, so that the cord may pass from
the wheel to the first pulley, and from the other pulley to the wheel ag-
without friction moving one of the pivots or gudgeons on which the wh-
runs three sixteenths of an inch toward one end of the churn will
accomplish this. That which I claim in the above described machine
as particularly new and of my own invention is the manner of applying the cord
to the pulleys for the purpose of churning Witnesses { Matthew Burchard
[illegible] Gray } [illegible]

(1358 [illegible])

(June 27 1832)